UNITED STATES PATENT OFFICE.

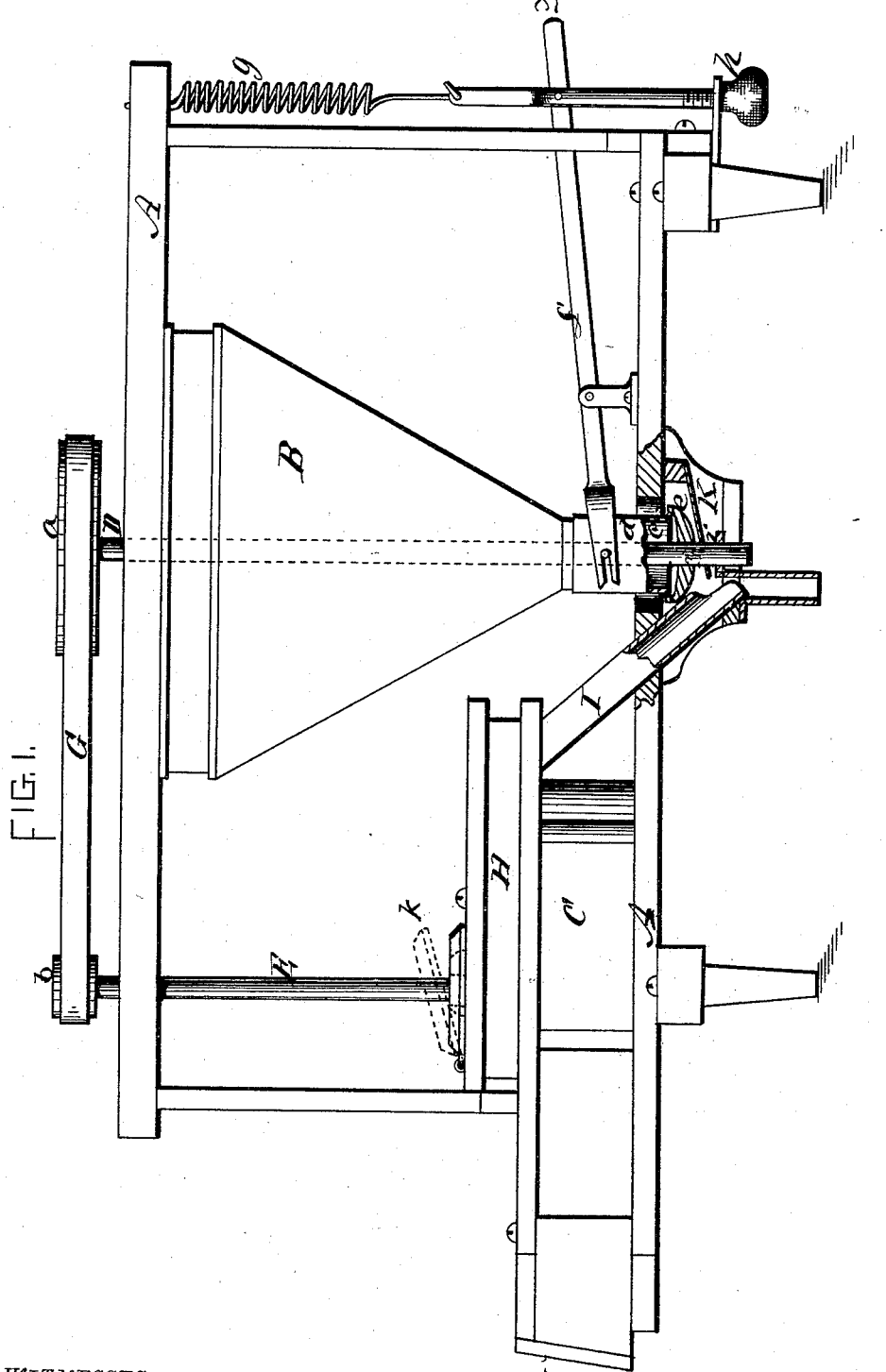

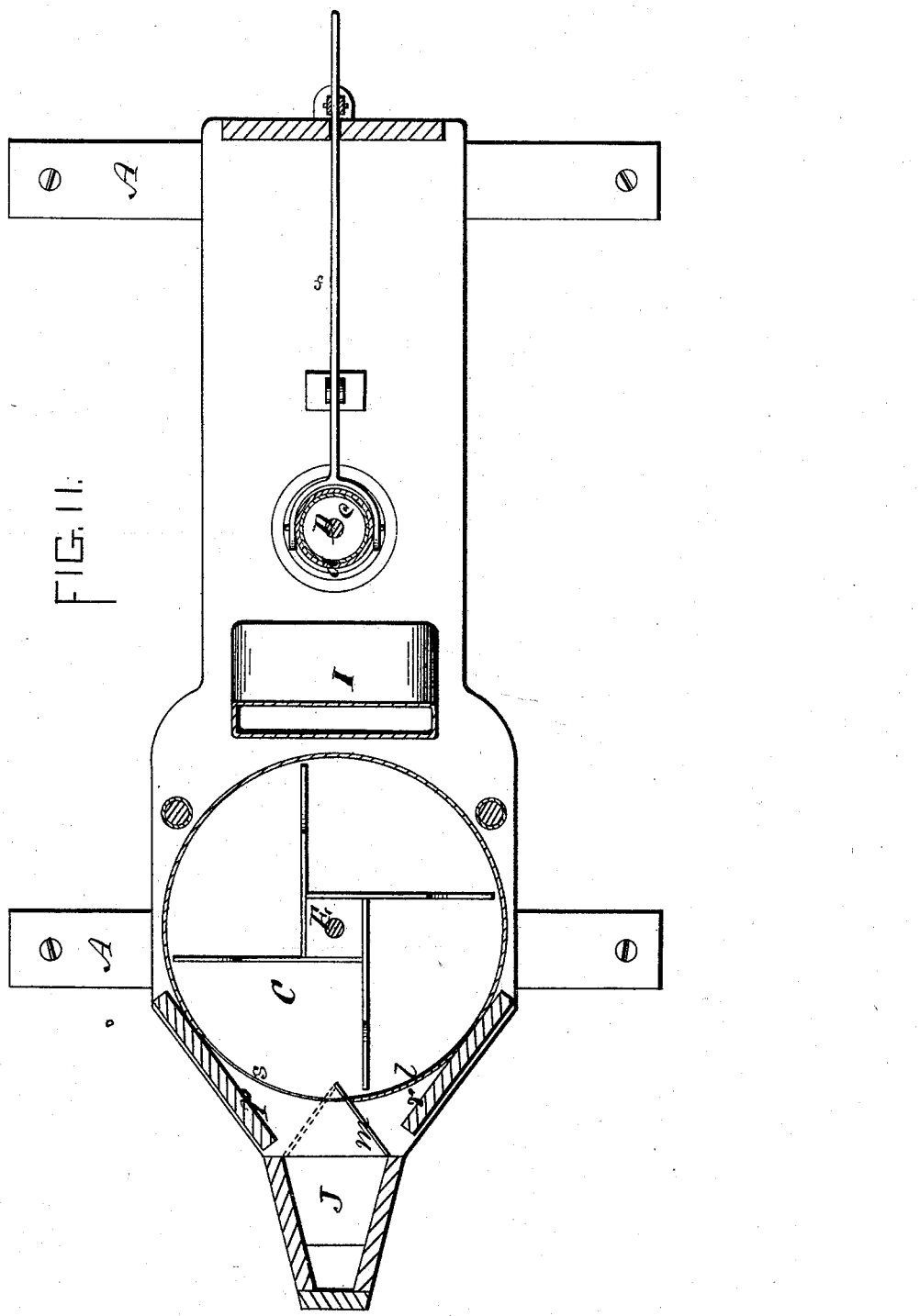

JOHN ALLISON, OF YORK, PENNSYLVANIA.

IMPROVEMENT IN GRAIN-CLEANING ATTACHMENTS FOR GRINDING-MILLS.

Specification forming part of Letters Patent No. 172,290, dated January 18, 1876; application filed November 12, 1875.

*To all whom it may concern:*

Be it known that I, JOHN ALLISON, of York, in the county of York and State of Pennsylvania, have invented an Improved Grain-Cleaning Attachment for Grinding-Mills; and I do hereby declare that the following is a full and exact description thereof, reference being had to the accompanying drawings, making part of this specification—

Figure 1 being a side elevation of the improved grain-cleaning attachment; Fig. 2, a horizontal section thereof in a plane indicated by the line $x$ $x$, Fig. 1.

Like letters designate corresponding parts in both figures.

This grain-cleaner is designed especially to be applied over a set of millstones, and to act in connection with the hopper, or to be provided with a hopper, to feed the grain to the millstones, and to separate impurities therefrom by a blast or draft of air caused to pass across the grain as it falls from the hopper.

My invention consists, first, in the improved method of applying, directing, and regulating the blast or draft of air to act upon the grain; second, in the peculiar construction and arrangement of a draft-fan, whereby it may be adjusted readily to a right-hand or a left-hand run of millstones.

In the drawings, the apparatus is represented as mounted in a movable frame or stand, A, the principal operative parts being the hopper B and draft-fan C. Vertically upward, in the center of the hopper B, extends a shaft, D, which is, or generally may be, a continuation of the mill-spindle that drives the runner millstone. By the motion of this shaft the feed of the hopper is effected and the fan C is revolved, the vertical shaft E of the fan being connected with the said shaft D by a belt, G, running on pulleys $a$ $b$ of the respective shafts. The grain is conducted from the hopper to the millstones below through a tube or passage, $c$, the quantity flowing therein, in a given time, being regulated by a vertically-sliding tubular valve, $d$, at the bottom of the hopper, shutting over a cup, $e$, over whose edges the grain flows, a controlling-lever, $f$, extending therefrom, as shown, the other end of which is automatically drawn up by a spring, $g$, and its height regulated by a set-screw, $h$. By this lever, also, the flow of grain to the millstones may be cut off at any time by the tube-valve shutting close into the cup $e$. The air is drawn into the fan C through a chamber, H, above it, and it is admitted into this chamber through a wide, shallow tube or passage, I, extending to a close chute, K, which receives the grain from the hopper above and conducts it to the millstones below. In the back side of this chute is a narrow opening, $i$, extending horizontally across nearly the whole width of the chute. This opening admits air in a thin stream, and directs it across the pathway of the falling grain to the passage I, and this draft draws all the lighter impurities falling with the grain into the said passage, thence to be drawn by the fan C and expelled from the machine.

The force of the draft through the passage I is regulated without changing the speed of the fan by means of a valve, K, opening to the air-chamber H. When this valve is entirely closed, as shown by full lines in Fig. 1, the full force of the draft is directed through the passage I; but by opening the valve more or less, as indicated by dotted lines in the same figure, more or less air is admitted to the fan thereby, thus diminishing the draft through the said passage.

The fan is arranged to be adapted either to a right or left run of millstones by means of a movable section, $l$, of the periphery of the fan-case, and of a shifting board or plate, $m$, employed in connection therewith, as shown in Fig. 2. The blast is expelled through a spout or nozzle, J, and is directed thereto from the fan-case either by a tangent-board, $p$, on one side, or by another tangent-board, $r$, on the other side, as shown, according to the direction in which the fan is desired to revolve. The movable section moves in a circular groove, $s$, in the bottom of the case, and a corresponding groove in the top of the case, and it is shown in the drawing as shoved over next to the tangent-board $r$, and the shifting plate $m$ is placed next to it, as shown by full lines. This arrangement directs the blast on the opposite side, next to the tangent-board $p$; but by moving the section $l$ over to the tangent-board $p$ and shifting the plate $m$ over to it, as shown by dotted lines, the blast is directed along by the tangent-board $r$. Thus the object is accomplished very simply and easily, and the same apparatus is adapted, without change of construction, to any run of millstones.

What I claim as my invention, and desire to secure by Letters Patent, is—

1. The horizontal narrow opening $i$ at the back of the grain-chute K, in combination with the wide air-passage I and millstone-hopper B, substantially as and for the purpose herein specified.

2. The movable fan-case section $l$ and shifting board or plate $m$, arranged and operating in combination with the fan-case and with its spout or nozzle J, substantially as and for the purpose herein specified.

Specification signed by me this 17th day of June, 1875.

JOHN ALLISON.

Witnesses:
A. K. ALLISON,
T. R. HENDRICKSON.